W. L. BROWN.
METER.
APPLICATION FILED DEC. 31, 1913.
1,216,412.
Patented Feb. 20, 1917.
FIG. I.
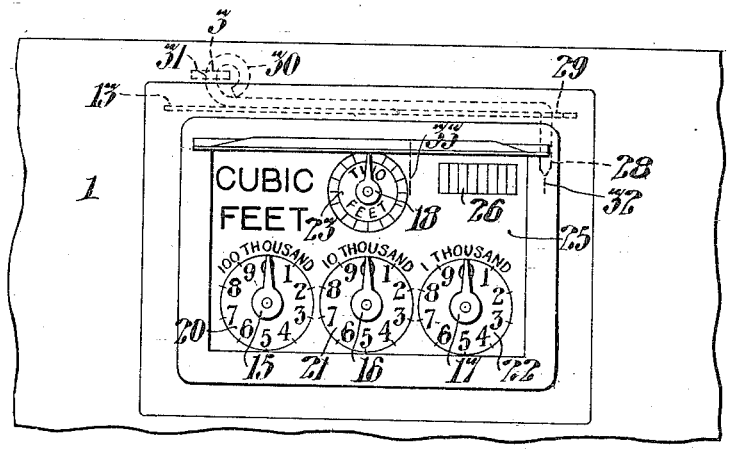
FIG. II.
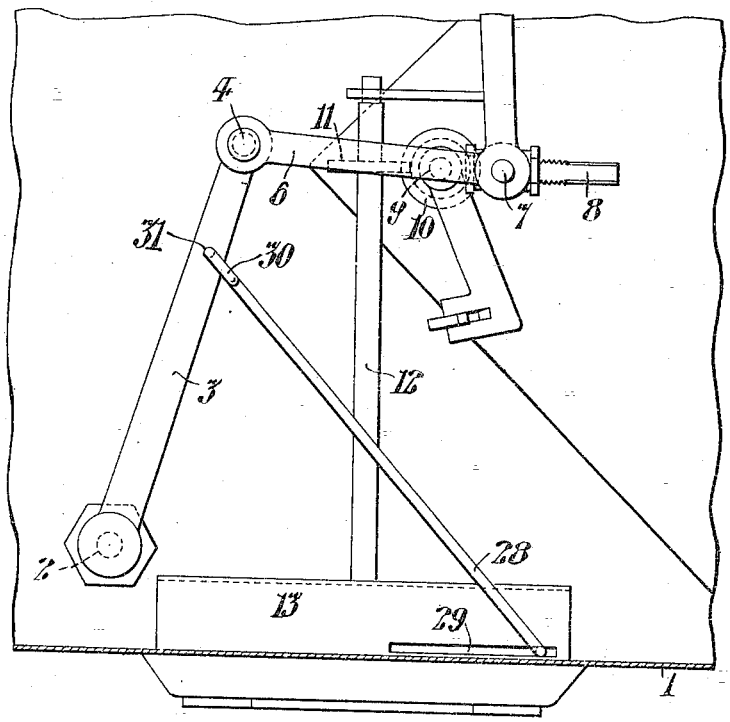
WITNESSES:
Philip W. Vessey
Joseph C. Dyal
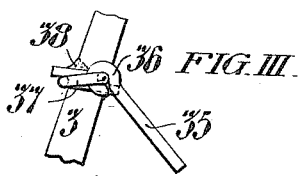
FIG. III.
INVENTOR:
William Laird Brown,
by Arthur E. Paige
Attorney.

UNITED STATES PATENT OFFICE.

WILLIAM LAIRD BROWN, OF LANSDOWNE, PENNSYLVANIA.

METER.

1,216,412. Specification of Letters Patent. Patented Feb. 20, 1917.

Application filed December 31, 1913. Serial No. 809,727.

*To all whom it may concern:*

Be it known that I, WILLIAM LAIRD BROWN, a citizen of the United States, residing at Lansdowne, in the county of Delaware and State of Pennsylvania, have invented a certain new and useful Improvement in Meters, whereof the following is a specification, reference being had to the accompanying drawing.

My invention is particularly applicable to gas meters of the type including bellows which are inflated by the gas passing through the meter and are operatively connected with a dial mechanism indicating the number of feet of gas passed through said bellows; said dial mechanism including four circular dials traversed by rotary indicators, each revolution of which indicates respectively 100,000, 10,000, 1,000, and 2 cubic feet. Upon installing such a meter, it is necessary for the inspector to shut all of the burner outlets and watch the dial mechanism for a considerable length of time to determine whether there is a leak in the piping system or not; the only means indicating such a leak being the slow rotary traverse of the indicators with respect to said dials.

The object of my present invention is to provide such a meter with an indicator which will instantly manifest whether there is any gas passing through the meter when the burners are closed.

As hereinafter described, my invention includes the combination with a meter casing having circular dials, of rotary indicators arranged to traverse said dials; a scale adjacent said dials, including a straight series of graduations; a reciprocatory indicator arranged to traverse said scale; an operating mechanism arranged to rotate said dial indicators and reciprocate said scale indicator at respectively different speeds, said scale indicator being shifted at variable speed from points of rest at respectively opposite ends of its range of movement; said range of movement being greater than the length of said scale, and the latter being located intermediate of said range; whereby said reciprocatory indicator only traverses its scale at a greater speed than the other indicators.

My invention includes the various novel features of construction and arrangement hereinafter more definitely specified.

In the drawings:—Figure I is a fragmentary front elevation of a meter embodying my invention, the top wall of the meter casing being removed.

Fig. II is a fragmentary plan view of the meter mechanism shown in Fig. I.

Fig. III is a fragmentary plan view showing a modified form of pivotal connection for the reciprocatory indicator.

In said figures: 1 is the meter casing inclosing the ordinary bellows mechanism which is operatively connected with the vertical rock shaft or "flag rod" 2 having the "long flag arm" 3 which is pivotally connected at 4 with the "short flag arm" or link 6 which is pivotally connected at its opposite end with the "tangent arm post" or crank pin 7 upon the "tangent arm" or crank 8 which is rigidly connected with the crank shaft 9 having the worm 10 engaging the worm gear 11 on the "horizontal axle" 12 of the dial mechanism in the frame 13, including the rotary indicators 15, 16, 17 and 18 which are arranged to traverse their respective circular dials 20, 21, 22 and 23 at respectively different speeds; so that each revolution of said indicators 15, 16, 17 and 18 respectively indicates the passage of 100,000, 10,000, 1,000, and 2 cubic feet of gas through the meter.

Said dials are on the plate 25 which also has the scale 26 adjacent said dials including a straight series of graduations arranged to be traversed by the reciprocatory indicator 28 which depends through the guide slot 29 in said frame 13 and is connected with said arm 3 at its opposite end by universal pivotal connection afforded by the bight 30 of said indicator extending through the aperture 31 in said arm 3.

Said reciprocatory indicator 28 is shown at one extreme of its range of movement indicated by the dash 32 which is a point of rest, and, by the oscillatory movement of said arm 3, is shifted to the opposite extreme of its range of movement indicated by the dash 33. Said scale 26 is made of less length than said range of movement of the indicator 28, and located intermediate of said range, so that said reciprocatory indicator traverses said scale at a greater speed than the other indicators, and the inspector can ascertain at a glance whether said indicator 28 is in motion with respect to said scale 26 or not.

It may be observed that the universal pivotal connection between said arm 3 and the reciprocatory indicator 28 permits the latter to conform both horizontally and vertically to the guidance of the slot 29, so as to permit of such variations in the location of the elements of the meter mechanism as are found in practice. Although I prefer to connect said reciprocatory indicator 28 with the arm 3 in the manner shown in Figs. I and II; I find it convenient to employ the modified form of joint shown in Fig. III when the reciprocatory indicator is to be applied as an attachment to an old meter. In said figure, the reciprocatory indicator 35, which is otherwise similar to the indicator 28, has the horizontal bight 36 encircling one limb of the wire loop 37 which may be conveniently attached to the arm 3 by the solder 38.

I do not desire to limit myself to the precise details of construction and arrangement herein set forth, as it is obvious that various modifications may be made therein without departing from the essential features of my invention as defined in the appended claims.

I claim:—

1. The combination with a meter casing having a scale including a straight series of graduations; of an indicator arranged to traverse said scale; an operating mechanism arranged to reciprocate said scale indicator; a universal pivotal joint between said indicator and said operating mechanism; and a guide including a slot engaging said indicator.

2. The combination with a meter casing having a rock shaft; of an arm on said rock shaft; a scale indicator; a pivotal connection between said arm and scale indicator, permitting the latter to oscillate vertically and horizontally; a scale including a straight series of graduations; and a guide for said indicator restricting the movement thereof to the direction of said series of graduations.

3. The combination with a meter casing having a rock shaft; of an arm on said rock shaft; an indicator; a pivotal connection between said arm and indicator, permitting the latter to oscillate vertically and horizontally; and a guide for the end of said indicator restricting the movement thereof to a straight line.

4. The combination with a meter casing including a crank, a rock shaft, and an arm on said rock shaft operatively connected with said crank; of an indicator directly pivotally connected with said arm, remote from said rock shaft; and a guide for the end of said indicator restricting the movement thereof to a straight line, including a frame having a slot in which the end of said indicator remote from said pivotal connection is arranged to reciprocate.

5. The combination with a meter casing including a crank, a rock shaft, and an arm on said rock shaft operatively connected with said crank; of an indicator directly pivotally connected with said arm, remote from said rock shaft; and a guide for the end of said indicator restricting the movement thereof to a straight line.

6. The combination with a meter casing including a crank, a rock shaft, and an arm on said rock shaft operatively connected with said crank; of an indicator directly pivotally connected with said arm; and a guide for the end of said indicator restricting the movement thereof to a straight line.

7. The combination with a meter casing including a crank, a rock shaft, and an arm on said rock shaft operatively connected with said crank; of an indicator directly pivotally connected with said arm, remote from said rock shaft; and a guide for the end of said indicator restricting the movement thereof to a straight line, including a frame having a slot in which the end of said indicator remote from said pivotal connection is arranged to reciprocate; and a scale, carried by said frame, including a straight series of equally spaced graduations; said series being of less extent than the reciprocatory traverse of said indicator in said frame, and intermediate of said slot.

8. The combination with a meter casing including a crank, a rock shaft, and an arm on said rock shaft operatively connected with said crank; of an indicator directly pivotally connected with said arm, remote from said rock shaft; and a guide for the end of said indicator restricting the movement thereof to a straight line, including a frame having a slot in which the end of said indicator remote from said pivotal connection is arranged to reciprocate; and a scale, carried by said frame, including a straight series of graduations; said series being of less extent than the reciprocatory traverse of said indicator in said frame, and intermediate of said slot.

9. The combination with a meter casing including a registering index, a crank, a rock shaft, and an arm on said rock shaft operatively connected with said crank; of an indicator directly pivotally connected with said arm, remote from said rock shaft; and a guide for the end of said indicator restricting the movement thereof to a straight line, including a frame having a slot in which the end of said indicator remote from said pivotal connection is arranged to reciprocate; and a scale, carried by said frame, including a straight series of graduations; said series being of less extent than the reciprocatory traverse of said indicator in said frame, and intermediate of the length of said slot; said scale indicator being moved at greater speed than said index, and the range of its movement being greater than the length of said scale.

In testimony whereof, I have hereunto signed my name at Philadelphia, Pa., this 26th day of Dec., 1913.

WILLIAM LAIRD BROWN.

Witnesses:
 MARY M. CALLA,
 WILSON MECKE, Sr.

Copies of this patent may be obtained for five cents each, by addressing the "Commissioner of Patents, Washington, D. C."